(12) United States Patent
Sim et al.

(10) Patent No.: US 12,152,972 B2
(45) Date of Patent: Nov. 26, 2024

(54) FILTER DETERMINING SYSTEM FOR EVALUATION OF DISSOLUTION QUALITY OF BINDER SOLUTION FOR SECONDARY BATTERY ELECTRODE AND DETERMINING METHOD THEREOF

(71) Applicant: LG ENERGY SOLUTION, LTD., Seoul (KR)

(72) Inventors: Hye Jin Sim, Daejeon (KR); Joo Yong Park, Daejeon (KR); Sung Soo Yoon, Daejeon (KR); Je Gwon Lee, Daejeon (KR); Hyeon Jeong Kang, Daejeon (KR); Young Seok Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 400 days.

(21) Appl. No.: 17/591,050

(22) Filed: Feb. 2, 2022

(65) Prior Publication Data
US 2022/0317010 A1    Oct. 6, 2022

(30) Foreign Application Priority Data
Mar. 30, 2021    (KR) .......................... 10-2021-0041347

(51) Int. Cl.
  *G01N 15/08*    (2006.01)
  *G01N 13/00*    (2006.01)
  *H01M 4/62*    (2006.01)

(52) U.S. Cl.
  CPC ............ *G01N 13/00* (2013.01); *H01M 4/623* (2013.01)

(58) Field of Classification Search
  CPC ..................... G01N 15/0826; G01N 2015/084
  See application file for complete search history.

(56) References Cited

U.S. PATENT DOCUMENTS

| 5,786,528 A | * | 7/1998 | Dileo | .................. B01D 65/102 |
| | | | | 73/38 |
| 2019/0027757 A1 | | 1/2019 | Inoue | |
| 2023/0175943 A1 | * | 6/2023 | Kim | ...................... H01M 4/623 |
| | | | | 73/866 |

FOREIGN PATENT DOCUMENTS

| DE | 202022100750 U1 | * | 4/2022 |
| JP | 06221979 A | * | 12/1994 |
| JP | H09-288103 A | | 11/1997 |
| JP | 2005-325342 A | | 11/2005 |
| JP | 2008-231321 A | | 10/2008 |
| JP | WO2009/047969 A1 | | 2/2011 |

(Continued)

*Primary Examiner* — Alexander A Mercado
(74) *Attorney, Agent, or Firm* — MORGAN, LEWIS & BOCKIUS LLP

(57) ABSTRACT

A system for determining a filter for evaluating a dissolution quality of a binder solution for a secondary battery electrode according to the present technology includes: a pressure container which accommodates a binder solution; a pressure medium supply source which supplies pressure medium of a predetermined pressure to the pressure container; a filter which is connected to the pressure container by a pipe; a flow rate measuring unit which measures a flow rate of the binder solution filtered by the filter; and a determination unit which measures a time point when a flow rate reaches a specific value predetermined in consideration of an initial flow rate by repeating measurement of the flow rate using each filter having a different pore size, and determines a filter having a filter size in an optimal pore size range based on the time point.

20 Claims, 4 Drawing Sheets

(56) References Cited

FOREIGN PATENT DOCUMENTS

| | | |
|---|---|---|
| JP | 2012-196590 A | 10/2012 |
| JP | 2018-149500 A | 9/2018 |
| JP | WO2017/154776 A1 | 1/2019 |
| JP | 3222460 U | 8/2019 |
| KR | 10-1998-0024438 A | 7/1998 |
| KR | 10-2013-0075515 A | 7/2013 |
| KR | 10-2014-0038949 A | 3/2014 |
| KR | 10-2017-0111722 A | 10/2017 |

* cited by examiner

[FIG. 1]
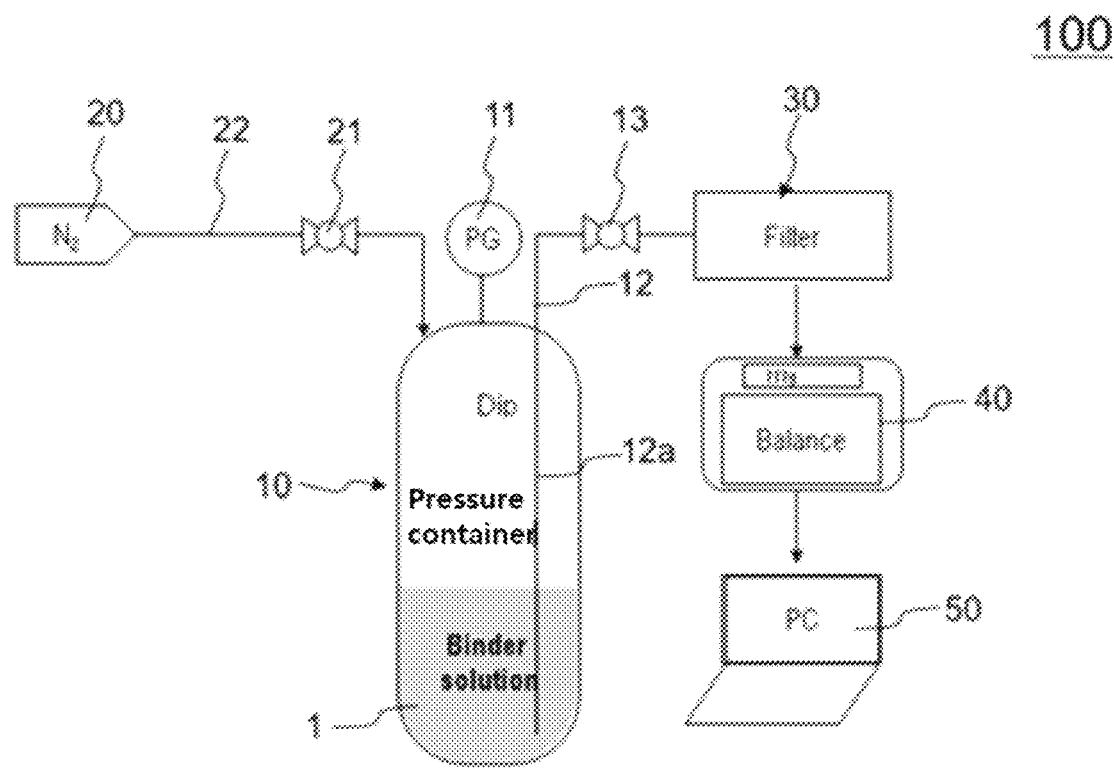

[FIG. 2]
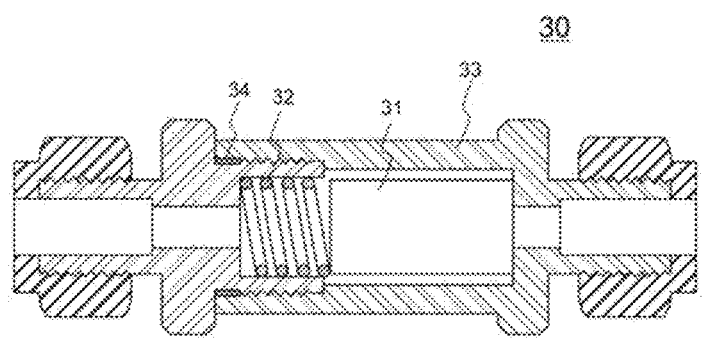

[FIG. 3]
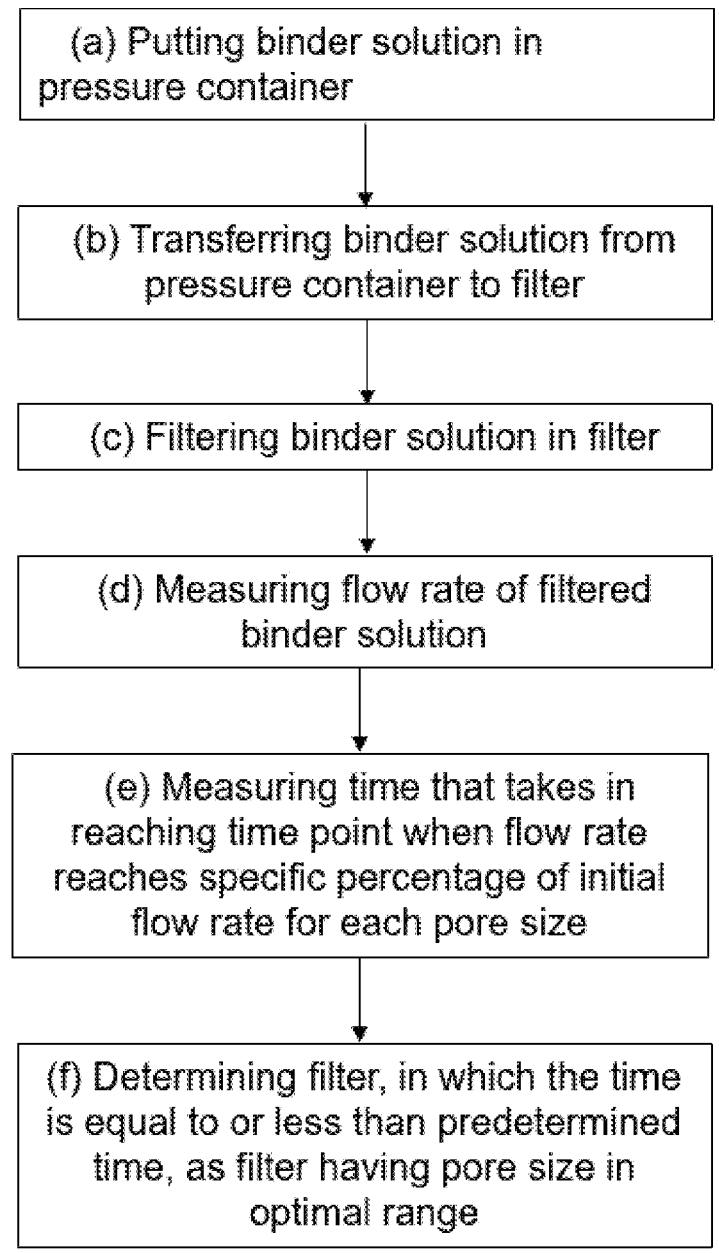

[FIG. 4]
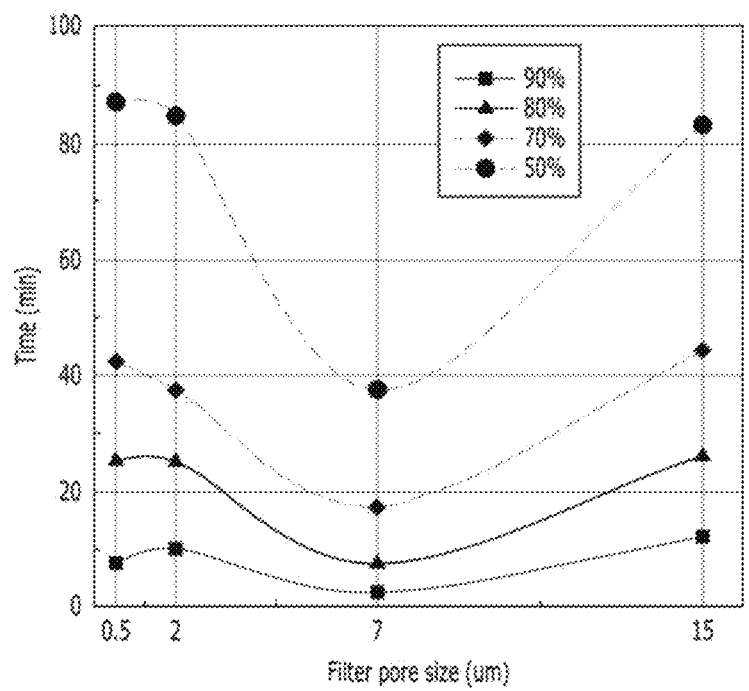

FILTER DETERMINING SYSTEM FOR EVALUATION OF DISSOLUTION QUALITY OF BINDER SOLUTION FOR SECONDARY BATTERY ELECTRODE AND DETERMINING METHOD THEREOF

CROSS-REFERENCE TO RELATED APPLICATION

This application claims the benefit of and the priority to Korean Patent Application No. 10-2021-0041347 filed on Mar. 30, 2021, which is hereby incorporated by reference as if fully set forth herein.

BACKGROUND

Technical Field

The present disclosure relates to a filter determining system and method for evaluation of dissolution quality of a binder solution for a secondary battery electrode. More specifically, the present disclosure relates to a system and method for determining an optimal filter capable of reducing evaluation time in evaluating the quality of a binder solution to be used for a secondary battery electrode.

Description of the Related Art

As technologies about mobile, automotive and energy storage devices are developed and their demands increase, the demand of batteries as an energy source has also increased rapidly. As such, many studies have been done for lithium secondary batteries having a high energy density and discharge voltage, and such lithium secondary batteries have been widely used.

An electrode, which is used for a lithium secondary battery, is formed by applying a mixture layer containing an active material on an electrode substrate made of a metal foil, and the mixture layer is formed as a positive electrode or negative electrode slurry is applied on an electrode substrate and is then dried. The electrode slurry is manufactured by mixing solids such as a positive electrode/negative electrode active material, and a conductive material with a binder solution and then drying the mixture.

The binder allows an active material to be attached to an active material or allows an active material to be attached to an electrode substrate, thereby improving adhesive force of the electrode and adjusting viscosity of the slurry. Since the binder is mixed with an active material, a conductive material, etc. in the form of a binder solution dissolved in a predetermined solvent, the dissolution quality of the binder influences the quality characteristics of an electrode slurry or an electrode. For example, when the dissolution quality of a binder such as CMC or PVDF is not good, various problems such as an increase in the viscosity of the slurry, an electrode coating surface defect, etc. may be caused. The dissolution quality of the binder depends on the minimization level of insoluble matters in the binder solution.

In related art, in order to evaluate the dissolution quality of a binder solution, the binder, which has not yet fully dissolved in the solution, was observed simply with naked eyes, or after applying a binder solution on an OHP film with a blade of a certain thickness, the number of foreign materials on the film was counted with naked eyes. Alternatively, in the case of the PVDF solution, a method of counting the number of foreign materials remaining in a nylon mesh filter by filtering the solution using the filter was applied.

However, according to the former method, it is difficult to recognize the overall quality of the solution due to the small amount of samples, and the measurement accuracy is not high because foreign materials may flow in and they are not distinguished from undissolved substances. Further, since the evaluation is performed by naked eyes, there may be a large error, depending on the evaluator.

In the method of measuring the number of foreign materials with the mesh filter, foreign materials originated from filter itself may flow into the filter, or during the filtering process, bubbles may be generated and foreign materials may be trapped in these bubbles. In some cases, during the filtering, moisture is mixed, PVDF are precipitated in the solution, which are phase-separated from NMP which is a solvent. As such, the dissolution quality evaluation reproducibility and accuracy were very low.

In order to solve these problems, the inventors of the present disclosure devised a method for quantitatively evaluating the dissolution quality of a binder solution without errors according to the evaluator while reducing the influence of the external environment by using an in-line filter.

However, in the case of such a dissolution quality evaluation method, it sometimes took excessively long time to evaluate the dissolution quality, depending of the type or the pore size of the filter used. If it takes too much time in evaluation, the productivity of the electrode slurry production using the binder solution will be deteriorated.

Hence, there is a need for a technology for improving the productivity by reducing the dissolution quality evaluation time of a binder solution to be used for manufacturing a secondary battery electrode.

RELATED ART DOCUMENTS

Patent Documents (Patent document 1) Korea Patent Publication No. 10-2017-0111722

SUMMARY

The present disclosure is believed to solve at least some of the above problems. For example, an aspect of the present disclosure provides a system and method for determining a filter to be used for evaluating the dissolution quality of a binder solution for a secondary battery electrode, in which evaluation time can be reduced, by determining an optimal filter which allows quantitative evaluation of the dissolution quality of a binder solution.

A system for determining a filter for evaluating a dissolution quality of a binder solution for a secondary battery electrode of the present disclosure for solving the above problems includes: a pressure container which accommodates a binder solution; a pressure medium supply source which supplies pressure medium of a predetermined pressure to the pressure container; a filter which is connected to the pressure container by a pipe; a flow rate measuring unit which measures a flow rate of the binder solution filtered by the filter; and a determination unit which measures a time point when the flow rate reaches a specific value predetermined in consideration of an initial flow rate by repeating measurement of the flow rate using a plurality of filters, each filter having a different pore size, and determines a filter having a pore size in an optimal pore size range based on the time point.

As one example, the determination unit may determine a filter having the time point equal to or less than a predetermined time point as a filter having a pore size in the optimal pore size range.

As one example, the pressure medium may be nitrogen, and nitrogen having a predetermined pressure may be supplied from the pressure medium supply source to the pressure container.

As a specific example, the pipe may be extended into the pressure container, and an end of the pipe may be installed to be adjacent to a bottom of the pressure container.

As one example, the filter may be an in-line filter which is installed in series in the pipe.

Specifically, the in-line filter may include a filtering member, an elastic member which presses the filtering member, and a housing where the filtering member and the elastic member are accommodated.

A method of determining a filter to be used for evaluating a dissolution quality of a binder solution for a secondary battery as an aspect of the present disclosure includes: injecting a predetermined amount of binder solution into a pressure container; transferring the binder solution to a filter by supplying pressure medium of a predetermined pressure to the pressure container; filtering the binder solution using the filter; measuring a flow rate of the binder solution having passed through the filter; measuring a time point when the flow rate reaches a specific value predetermined in consideration of an initial flow rate by repeating measurement of the flow rate using a plurality of filters, each filter having a different pore size; and determining a filter having the time point equal to or less than a predetermined time point as a filter having a pore size in the optimal pore size range.

As one example, a filter, which has a pore size, at which the time point becomes an earliest time point, may be determined as the filter having the optimal pore size.

As one example, a binder, which is a solute of the binder solution, may be at least one selected from the group consisting of: (i) a non-aqueous binder including polyvinylidene fluoride-co-hexafluoropropylene (PVDF-co-HFP), polyvinylidene fluoride (PVDF), polyacrylonitrile, polymethyl methacrylate, polyvinyl alcohol, carboxyl methyl cellulose (CMC), starch, hydroxypropylcellulose, regenerated cellulose, polyvinylpyrrolidone, tetrafluoroethylene, polyethylene, polypropylene, polyacrylic acid, ethylene-propylene-diene monomer (EPDM), sulfonated EPDM, or polytetrafluoroethylene (PTFE); (ii) an aqueous binder including acrylonitrile-butadiene rubber, styrene-butadiene Rubber (SBR) or acrylic rubber; and (iii) a polymer resin including hydroxyethylcellulose or carboxymethylcellulose.

As one example, a solvent of the binder solution may be at least one selected from the group consisting of: (i) an organic solvent including N-methylpyrrolidone (NMP), dimethylformamide (DMF), acetone or dimethyl acetamide, and (ii) water.

As a specific example, the binder solution may be a PVDF solution obtained by dissolving a predetermined content of PVDF in an NMP solvent.

As one example, a filter, which has the time point when the flow rate has decreased to 50% of the initial flow rate less than a predetermined time point, may be determined as a filter having a pore size in the optimal pore size range.

As another example, a filter, which has the time point when the flow rate has decreased to 80% of the initial flow rate less than a predetermined time point, may be determined as a filter having a pore size in the optimal pore size range.

According to the present disclosure, it is possible to determine an optimal filter for quantitatively evaluating the dissolution quality of a binder solution for a secondary battery electrode.

Further, the evaluation time can be significantly reduced by evaluating the dissolution quality of a binder solution by using the optimal filter, thereby improving the productivity of the binder solution and the electrode slurry.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiment(s) of the disclosure and together with the description serve to explain the principles of the disclosure. In the drawings:

FIG. 1 is a schematic diagram of a system for determining a filter to be used for evaluating the dissolution quality a binder solution for a secondary battery electrode of the present disclosure.

FIG. 2 is a schematic drawing showing parts of a filter which is an element of the system of FIG. 1.

FIG. 3 is a flowchart illustrating an order of a method of determining a filter for evaluating the dissolution quality of a binder solution for a secondary battery electrode of the present disclosure.

FIG. 4 is a graph illustrating a change at a time point when a flow rate reaches a specific value predetermined in consideration of an initial flow rate according to the pore size of a filter according to an embodiment of the present disclosure.

DETAILED DESCRIPTION

Reference will now be made in detail to embodiments of the present disclosure, examples of which are illustrated in the accompanying drawings. The terms and words used in the present specification and claims should not be construed as limited to ordinary or dictionary terms and the inventor may properly define the concept of the terms in order to best describe its disclosure. The terms and words should be construed as meaning and concept consistent with the technical idea of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents.

The shapes, sizes, ratios, angles, numbers, and the like, which are illustrated in the drawings to describe various example embodiments of the present disclosure, are merely given by way of example. Therefore, the present disclosure is not limited to the illustrations in the drawings. The same or similar elements are designated by the same reference numerals throughout the specification unless otherwise specified.

In the following description, where the detailed description of the relevant known function or configuration may unnecessarily obscure an important point of the present disclosure, a detailed description of such known function of configuration may be omitted.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof unless the term, such as "only," is used. An element described in the singular form is intended to include a plurality of elements, and vice versa, unless the context clearly indicates otherwise. In construing an element, the element is to be construed as including an error or tolerance range even where no explicit description of such an error or tolerance range is provided.

Also, when a portion such as a layer, a film, an area, a plate, etc. is referred to as being "on" another portion, this includes not only the case where the portion is "directly on" another portion but also the case where further another portion is interposed therebetween. On the other hand, when a portion such as a layer, a film, an area, a plate, etc. is referred to as being "under" another portion, this includes not only the case where the portion is "directly under" another portion but also the case where further another portion is interposed therebetween. In addition, to be disposed "on" in the present application may include the case disposed at the bottom as well as the top.

In describing a temporal relationship, when the temporal order is described as, for example, "after," "subsequent," "next," or "before," a case which is not continuous may be included unless a more limiting term, such as "just," "immediate(ly)," or "direct(ly)," is used.

Although the terms "first," "second," and the like may be used herein to describe various elements, these elements should not be limited by these terms as they are not used to define a particular order. These terms are used only to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, and the third element.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in a co-dependent relationship.

An object of the present disclosure is to determine an optimal filter, which is used for a method of evaluating the dissolution quality by an in-line filter capable of quantitatively evaluating the quality of a binder solution without an error according to the evaluator while reducing the influence of the external environment. Namely, in the present disclosure, the binder solution flows in a pressure container, a pipe and an in-line filter connected to the pressure container and the pipe. Hence, the present disclosure is based on a dissolution quality evaluation system or method in which the binder solution is not exposed to the outside during the dissolution quality evaluation process.

Hereinafter, example embodiments of the present disclosure will be described in detail with reference to the accompanying drawings.

FIG. 1 is a schematic diagram of a system for determining a filter to be used for evaluating the dissolution quality a binder solution for a secondary battery electrode of the present disclosure.

The system 100 for determining a filter includes: a pressure container 10 which accommodates a binder solution; a pressure medium supply source 20 which supplies pressure medium of a predetermined pressure to the pressure container 10; a filter 30 which is connected to the pressure container 10 by a pipe 12; a flow rate measuring unit 40 which measures a flow rate of the binder solution 1 filtered by the filter 30; and a determination unit 50 which determines a filter having a pore size in the optimal pore size range.

The filter determination system 100 of the present disclosure accommodates a binder solution 1 in a pressure container 10 so that the binder solution for evaluation of the dissolution quality is not to be exposed to the external environment. The pressure container 10 is a container which is sealed and to which pressure is applied, and is a container capable of withstanding a predetermined pressure. For example, a container capable of enduring a predetermined pressure when pressure medium having the pressure are supplied may be used as the pressure container 10. Namely, the pressure container 10 of the system 100 is a container with a sealing property and pressure resistance and is a container capable of accommodating a binder solution 1 for a secondary battery. The capacity of the pressure container may be appropriately selected in the range of accommodating a binder solution of an amount which is appropriate for performing filtering. For example, a pressure container of 20 kg capacity may be used. The amount of the binder solution accommodated in the pressure container can be appropriately selected within the range of the capacity of the pressure container. For example, a solution of 1 to 5 kg can be filled in the pressure container 10.

In order to transfer the binder solution to the filter 30, a pressure medium supply source 20 is necessary. For example, in the case that the binder solution is accommodated in the pressure container 10, if pressure medium having a pressure greater than that in the pressure container is supplied to the pressure container 10, the binder solution 1 in the container may be transferred to the filter 30 by the pressure. Dried air or inert gas, which does not influence physical and chemical properties of the binder solution, may be used as the pressure medium. Particularly, nitrogen may be used as the pressure medium in terms of management and manufacturing costs. The pressure medium supply source 20, for example, a nitrogen supply source, may be a nitrogen tank which contains nitrogen compressed by a high pressure. Nitrogen of a predetermined pressure is supplied from the pressure medium supply source to the pressure container 10 through a supply line 22. An opening/closing valve or control valve 21 for controlling the flow of the pressure medium may be installed at the supply line 22.

The pressure medium has a pressure greater than that of the inside of the pressure container 10 and has a predetermined pressure which allows the binder solution 1 in the pressure container 10 to a filter. When the pressure medium is nitrogen, the nitrogen may be at about 1 to 7 bar pressure and may be transferred to the pressure container 10.

If the solution is filled in the pressure container 10, the solution in the pressure container 10 may be transferred to the outside by applying certain pressure to the space above the solution. To this end, the pressure container 10 is connected to a solution discharge pipe 12 which is connected to the filter 30. As illustrated in FIG. 1, the solution discharge pipe 12 is extended to the inside of the pressure container 10, and the end of the solution discharge pipe 12 is placed to be adjacent to the bottom of the pressure container 10. Hence, a part 12a of the solution discharge pipe 12 is immersed in the binder solution 1. Likewise, when the solution discharge pipe 12 is installed to be adjacent to the bottom of the pressure container 10, if a constant pressure is applied to a space on the upper portion of the solution to push the solution to the filter side, most of the solution can be transferred to the filter 30. An opening/closing valve 13 is installed at the solution discharge pipe 12 between the pressure container 10 and the filter 30. Further, a pressure gauge 11 may be connected to the pressure container 10 in order to measure the pressure in the pressure container 10.

The binder solution 1, which is pushed up from the pressure container 10, is transferred to a filter through the pipe 12. At this time, the filter 30 is an in-line filter which is installed in the pipe in series. The in-line filter is filter which is consecutively installed in the pipe line so that the flow of solution through the pipe line passes through the filter and consecutively to the subsequent pipe. Hence, when the in-line filter is used, the binder solution, which passes through the pipe and the filters, is not exposed to the outside during the filtering process. As such, it is possible to prevent the contamination by the external environment during the filtering process for evaluation of the dissolution quality.

FIG. 2 is a schematic drawing showing parts of an in-line filter which is an element of the system of FIG. 1. The filter 30 of FIG. 2 includes a filtering member 31, an elastic member 32 which presses the filtering member 31, and a housing 33 where the filtering member 31 and the elastic member 32 are accommodated. The elastic member 32 fixes the filtering member 31 and allows the filtering member 31 to be closely attached to the housing to thereby prevent the leakage of the solution. Further, the in-line filter 30 includes a gasket 34 for preventing the leakage of the solution. The front and rear ends of the filter are coupled to the pipe.

The pore size of the filtering member 31 may be variously selected in consideration of the type of the used binder, the flow rate of the solution, and foreign material characteristics such as the size of the insoluble matters, etc. As described above, a filtering member having an appropriate pore size in the range of, for example, 0.5 to 100 μm may be selected.

The flow rate of the binder solution filtered in the filter is measured in the flow rate measuring unit 40. For example, the flow rate measuring unit 40 may be an electronic scale. A container, for example, a beaker is installed on an electronic scale, and the flow rate of the filtered binder solution falling down into the beaker can be measured. The flow rate measuring unit can measure the accumulation amount of the solution which has been filtered for a predetermined time.

Further, the flow rate measuring unit 40 can measure the time point when a flow rate of the binder solution reaches a specific value predetermined in consideration of an initial flow rate. For example, the flow rate of the solution falling into the container may be measured at regular time intervals, and flow rate per second for a certain period of time can be obtained by calculating the average of the flow rates. If the flow rate per second is obtained, the flow rate per minute and the initial flow rate (g/min) can be obtained. Further, since the flow rate per second decreases over filtering time, the time point when a flow rate reaches a specific value can be calculated by calculating the change in the flow rate per second and the flow rate reduction time. Hence, in the present specification, the time point when a flow rate reaches a specific value predetermined in consideration of an initial flow rate means time takes until an initial flow rate is reduced to a specific flow rate.

The flow rate measuring unit 40 is connected to the determination unit 50, and the flow rate data measured in the flow rate measuring unit 40 are transmitted to the determination unit 50. The determination unit 50 can calculate the accumulation amount filtered and the time point when a flow rate reaches a specific value predetermined in consideration of an initial flow rate by a predetermined program.

The dissolution quality of the target binder solution can be evaluated by the accumulation amount filtered and the time point when a flow rate reaches a specific value predetermined in consideration of an initial flow rate. For example, when the same filter is used, it can be said that a solution having a large accumulation amount filtered has a better dissolution quality than a solution having a small accumulation amount filtered. Since undissolved substances in the solution are attached on the filter and the solution, from which undissolved substances have been removed, passes through the filter, it can be said that a solution having a large accumulation amount filtered has a good dissolution quality.

Further, a solution, in which the time point when a flow rate reaches a specific value predetermined in consideration of an initial flow rate is later, for example, a solution, in which the time point when the flow rate reaches a value corresponding to 80% of the initial flow rate is later, has a superior dissolution quality than that of a solution, in which the time point when the flow rate reaches a value corresponding to 80% of the initial flow rate is earlier. The fact that time that takes in reduction to the flow rate corresponding to 80% of the initial flow rate is long means that filter clogging is less. Hence, generally, the dissolution quality of a solution, in which the time point when a flow rate reaches a specific value predetermined in consideration of an initial flow rate is later, is superior.

However, the present disclosure focuses on which filter should be used to reduce the time that takes in evaluating the dissolution quality rather than focusing on evaluating the dissolution quality itself of the binder solution by the filter determination system 100.

To this end, the determination unit 50 does not simply measure only the time point when a flow rate reaches a specific value predetermined in consideration of an initial flow rate. Rather, the determination unit 50 repeats the flow rate measurement for each filter having a different pore size, and measures the time point when a flow rate reaches a specific value predetermined in consideration of an initial flow rate for each filter, thereby determining a filter having a pore size in the optimal pore size range based on the information on the time point. Specifically, the determination unit may determine a filter having the time point equal to or less than a predetermined time point as a filter having a pore size in the optimal pore size range. Namely, the dissolution quality of a solution, in which the time point when a flow rate reaches a specific value predetermined in consideration of an initial flow rate is later, is superior, but if it takes too much time in evaluating the time point, the practicality of the dissolution quality evaluation of the binder solution is greatly dropped. Such time points are different according to the pore size of the filter used. Hence, when measuring the flow rate by filtering the binder solution, a filter's pore size, in which the defect of the binder solution can be quickly evaluated, influences the manufacturing productivity of a binder solution and an electrode slurry which uses the binder solution. The determination unit can measure the time point when a flow rate reaches a specific value predetermined in consideration of an initial flow rate for each filter, and determine the filter having the pore size in the optimal pore size range by comparing the time points. To this end, the determination unit has a predetermined program for determining the time points when a flow rate reaches a specific value predetermined in consideration of an initial flow rate for filters by pore sizes.

The process of determining a filter by the determination unit 50 will be specifically described with reference to the following method of determining a filter and examples.

FIG. 3 is a flowchart illustrating an order of a method of determining a filter for evaluating the dissolution quality of a binder solution for a secondary battery electrode of the present disclosure.

As illustrated, a method of determining a filter of the present disclosure includes: injecting a predetermined amount of binder solution into a pressure container; (step (a) of FIG. 3); transferring the binder solution to a filter by supplying pressure medium of a predetermined pressure to the pressure container (step (b) of FIG. 3); filtering the binder solution using the filter (step (c) of FIG. 3); measuring a flow rate of the binder solution having passed through the filter (step (d) of FIG. 3); measuring a time point when a flow rate reaches a specific value predetermined in consideration of an initial flow rate by repeating measurement of the flow rate using each filter having a different pore size (step (e) of FIG. 3); and determining a filter having the time point equal to or less than a predetermined time point as a filter having a pore size in the optimal pore size range (step (f) of FIG. 3).

The process of putting a binder solution in a pressure container, supplying pressure medium to the pressure container to transfer the binder solution to a filter, for example, an in-line filter, filtering the binder solution in the filter, and measuring the flow rate of the binder solution having passed through the filter using a flow rate measuring unit such as an electronic scale has been described above with reference to FIGS. 1 and 2.

In the method of determining a filter of the present disclosure, in order to determine a filter having a pore size in the optimal pore size range, the flow rate was repeatedly measured for filters having different pore sizes, to thereby measure time points when a flow rate reaches a specific value predetermined in consideration of an initial flow rate for the filters. As described above, a solution, where a time point when a flow rate reaches a specific value predetermined in consideration of an initial flow rate is late, has a good dissolution quality, but if it is too late, it takes too much time in evaluating the solution, thereby dropping the productivity of dissolution quality evaluation. Hence, the present disclosure not only evaluates the dissolution quality using the time point when a flow rate reaches a specific value predetermined in consideration of an initial flow rate, but also determines a filter having an optimal pore size by comparing the time points by pore sizes.

Specifically, a filter having the time point equal to or less than a predetermined time point is determined as a filter having a pore size in the optimal pore size range. The predetermined time point may be the time point when the time point when a flow rate reaches a specific value predetermined in consideration of an initial flow rate is the earliest. In this case, the filter having a pore size, in which the time point when a flow rate reaches a specific value predetermined in consideration of an initial flow rate becomes minimum, can become the optimal filter.

When the wording "less than the predetermined time", it means that time that takes in determining the time point becomes less than specific time such as 10 minutes, 20 minutes or 30 minutes. A filter having a pore size in the pore size range, where the time point when a flow rate reaches a specific value predetermined in consideration of an initial flow rate is equal to or less than a predetermined value, can be determined as a filter having a pore size in the optimal pore size range.

The predetermined value can be changed according to the type of the binder solution, the pore size of the filter, the type and size of undissolved substances in the solution, the mixing time of the binder solution, the mixing temperature, the type of the mixing blade used, etc. What is important is that regardless of the specification of the binder solution, when the binder solution is filtered for each pore size according to the filter determination method of the present disclosure, a filter, where the time point when a flow rate reaches a specific value predetermined in consideration of an initial flow rate becomes minimum, can be determined as the filter in the optimal range.

Further, any binder, which is commonly used in the related field, can be used as a solute which is used for a binder solution for a secondary battery electrode. For example, a binder, which is a solute of the binder solution, may be at least one selected from the group consisting of a non-aqueous binder such as polyvinylidene fluoride-co-hexafluoropropylene (PVDF-co-HFP), polyvinylidene fluoride (PVDF), polyacrylonitrile, polymethyl methacrylate, polyvinyl alcohol, carboxyl methyl cellulose (CMC), starch, hydroxypropylcellulose, regenerated cellulose, polyvinylpyrrolidone, tetrafluoroethylene, polyethylene, polypropylene, polyacrylic acid, ethylene-propylene-diene monomer (EPDM), sulfonated EPDM, or polytetrafluoroethylene (PTFE); an aqueous binder such as acrylonitrile-butadiene rubber, styrene-butadiene Rubber (SBR) or acrylic rubber; and a polymer resin such as hydroxyethylcellulose or carboxymethylcellulose.

Further, a solvent of the binder solution for a secondary battery electrode may be one selected from the group consisting of an organic solvent such as N-methylpyrrolidone (NMP), dimethylformamide (DMF), acetone or dimethyl acetamide, and water, or a mixture thereof. The amount of the solvent used is sufficient as long as it allows the electrode active material, the binder and the conductive material to be dissolved and dispersed in consideration of the applied thickness and production yield of the electrode active material slurry.

A PVDF solution or a CMC solution, which is appropriate for evaluating the dissolution quality by a filtering method by an in-line filter, may be used among binder solutions for a secondary battery in the present disclosure. A binder solution, which is obtained by dissolving a predetermined content of PVDF as a solute in NMP as a solvent, may be used as the PVDF solution. The binder solution, which is obtained by dissolving a predetermined content of CMC in water, may be used as the CMC solution. The concentration of the binder solution is sufficient as long as it can dissolve solids by being mixed with the electrode slurry and the conductive material. Generally, PVDF solution of concentration of 1 to 15% and CMC solution of concentration of 0.1 to 10% can be used.

EXAMPLE

Hereinafter, the present disclosure will be described in detail, but the present disclosure is not limited by these examples.

Example 1

PVDF solution A of 9% concentration was prepared by injecting PVDF powder into NMP and performing stirring at 50° C. for 50 minutes.

The solution A of 1 gallon (3.7854 liters) was put into the pressure container of FIG. 1, and nitrogen of 3.5 bar from a nitrogen gas source was added to the pressure container, to thereby transfer the solution A in the pressure container to the filter to be filtered. The filter is a F1 series in-line filter of Hy-Lok Korea, and the used filtering member is a depth filter made of stainless steel. The accumulation amount filtered and the time point when a flow rate reaches a specific value predetermined in consideration of an initial flow rate were measured by measuring the flow rate of the filtered solution using an electronic scale (GP30K electronic scale of AND Co., Ltd.). The initial flow rates and time points when a flow rate reaches a specific value predetermined in consideration of an initial flow rate, which were measured by using respective pore sizes of 0.5, 2, 7 and 15 μm, are shown in Table 1 below.

Further, the change in time points when a flow rate reaches a specific value predetermined in consideration of an initial flow rate according to the filter's pore size of the example 1 based on Table 1 below is shown in FIG. 4.

In the filter having a large pore size, that is, a 15 μm pore size of example 1-4, the speed, at which the undissolved substances are filtered in the filter, is superior, but it takes long time in being reduced to a specific flow rate because small undissolved substances pass through the filter. This is because the size of most of undissolved substances in the PVDF is in the range of 7 to 15 μm. Further, in the case of the filter having a small pore size, it is expected that the time point when a flow rate reaches a specific value predetermined in consideration of an initial flow rate would be quickened as the filter is more quickly blocked by undissolved substances. However, since the initial flow rate is small due to the small pore size, the time point when a flow rate reaches a specific value predetermined in consideration of an initial flow rate is not quickened in proportion to the pore size. Hence, the time point when a flow rate reaches a specific value predetermined in consideration of an initial flow rate is changed according to the pore size of the filter according to the dissolution quality or the size of undissolved substances in a solution. As such, it is seen that the filter having the optimal pore size can be determined according to the time point when a flow rate reaches a specific value predetermined in consideration of an initial flow rate.

Further, the pore size in the optimal range can be changed depending on which specific flow rate reduction time point is selected as the criterion for determination. For example, if 50% of the initial flow rate is used as the criterion, the filter in the pore size range where the time is less than 40 minutes can be used as the filter having the pore size in the optimal pore size range. Namely, the optimal pore size is 7 μm where the time is 38 minutes, which is the minimum time, but if 40 minutes are the criterion time, the filter having a pore size in the range of 6.2 to 8 μm may also be determined as the filter having a pore size in the optimal pore size range from FIG. 4.

Alternatively, if the time point when a flow rate reaches 80% of an initial flow rate is used as the criterion, 7 μm pore size, in which the time point is 8 minutes, becomes the optimal pore size, and if the reduction time point is set to be 10 minutes or less, the pore size range of 5.5 to 9 μm can be determined as the optimal pore size from FIG. 4.

Example 2

The PVDF solution having the same composition as in the example 1 was stirred at 50° C. for 50 minutes while changing the type of the stirring blade, to thereby prepare

TABLE 1

| Sample | Example | Pore size (μm) | Initial flow rate (g/min) | Time point when flow rate reaches specific value (percentage compared to the initial flow rate)(min.) | | | |
|---|---|---|---|---|---|---|---|
| | | | | 90% | 80% | 70% | 50% |
| A | 1-1 | 7 | 11.4 | 3 | 8 | 18 | 38 |
| | 1-2 | 0.5 | 0.5 | 8 | 25 | 43 | 88 |
| | 1-3 | 2 | 1.1 | 10 | 25 | 38 | 85 |
| | 1-4 | 15 | 17.6 | 12 | 26 | 44 | 83 |

As shown in the above Table 1 and FIG. 4, the filter having the pore size of 7 μm showed the smallest value in all time points when a flow rate reaches a specific value predetermined in consideration of an initial flow rate. Namely, it is seen that the filter having the 7 μm pore size is the optimal pore size filter capable of minimizing the time that takes in evaluation of the dissolution quality of solution A.

solution B. The solution B was filtered by the filter determination system of the same condition as that of the example 1, and the measurement was repeated while using filters having different pore sizes of 2 and 7 μm. In this experiment, the initial flow rates and the time points when a flow rate reaches a specific value predetermined in consideration of an initial flow rate are shown in Table 2 below.

TABLE 2

| Sample | Example | Pore size (μm) | Initial flow rate (g/min) | Time point when flow rate reaches specific value (percentage compared to the initial flow rate)(min.) | | | |
|---|---|---|---|---|---|---|---|
| | | | | 90% | 80% | 70% | 50% |
| B | Example 2-1 | 7 | 48.0 | 3 | 8 | 15 | 37 |
| | Example 2-2 | 2 | 5.0 | 20 | 30 | 45 | 80 |

In the case of the example 2, the time points when a flow rate reaches a specific value predetermined in consideration of an initial flow rate were a little bit different from those in the example 1, but the fact that the minimum time was shown in the 7 μm pore size was the same in examples 1 and 2. Further, the time point when a flow rate reaches 50% of the initial flow rate is equal to or less than 40 minutes, and the time point when a flow rate reaches 80% of the initial flow rate is equal to or less than 10 minutes. As such, the filter having the pore size in the corresponding pore size range (about 7 μm) may be determined as the filter in the optimal pore size range.

In the sample A of the example 1 and the sample B of the example 2, the time point when a flow rate reaches 80% of an initial flow rate was less than 10 minutes. This means that the initial flow rate is reduced to 80% of the initial flow rate within a very short time of 10 minutes, and thus the sample A and the sample B cannot be regarded as a binder solution of a good quality. Further, in the binder solution of the sample A and the sample B, the flow rate is continually reduced to 70% or 50% of the initial flow rate, and thus the binder solution can be regarded as a binder solution of a poor quality. However, as shown above, when the dissolution quality of a binder solution of a poor quality is examined, it is seen that the examination time can be reduced to the minimum when examined by using a filter having a 7 μm pore size which is the optimal pore size.

Example 3

The PVDF solution having the same composition as in the example 1 was stirred at 70° C. for 4 hours while changing the type of the stirring blade, to thereby prepare solution C. Since a different stirring blade and different stirring time were used, it is expected that solution C would dissolution quality and filtering characteristics which are different from those of solution A and solution B. The solution C was filtered by the filter determination system of the same condition as that of the example 1, and the measurement was repeated while using filters having different pore sizes of 2 and 7 μm. In this experiment, the initial flow rates and the time points when a flow rate reaches a specific value predetermined in consideration of an initial flow rate are shown in Table 3 below.

The flow rate of the binder solution of the sample C was maintained after being reduced to 80% of the initial flow rate. Further, since time that takes in reaching the time point when a flow rate reaches 80% of the initial flow rate is much longer in the sample C than that of samples A and B, it can be determined as a binder solution of a good quality.

Further, in the example 3, time that takes in reaching the time point when a flow rate reaches 80% of the initial flow rate was 42 minutes in the case of using 7 μm pore size and 795 minutes in the case of using 2 μm pore size. In the case of using 2 μm pore size, the time is too long, and thus it is very difficult to evaluate the dissolution quality. In the example 3-1, the time that takes in reaching the time point when a flow rate reaches 80% of the initial flow rate was 42 minutes. Hence, it is seen that the filter having a 7 μm pore size, which is the optimal pore size, is valid in measuring the time point when a flow rate reaches a specific value predetermined in consideration of an initial flow rate of a good product.

The above-described features, structures, and effects of the present disclosure are included in at least one example embodiment of the present disclosure, but are not limited to only one example embodiment. Furthermore, the features, structures, and effects described in at least one example embodiment of the present disclosure may be implemented through combination with or modification of other embodiments by those skilled in the art. Therefore, content associated with the combination and modification should be construed as being within the scope of the present disclosure.

It will be apparent to those skilled in the art that various substitutions, modifications, and variations are possible within the scope of the present disclosure without departing from the spirit and scope of the present disclosure. Therefore, it is intended that embodiments of the present disclosure cover the various substitutions, modifications, and variations of the present disclosure, provided they come within the scope of the appended claims and their equivalents.

DESCRIPTION OF REFERENCE NUMERALS

1: binder solution
10: pressure container
11: pressure gauge

TABLE 3

| Sample | Example 3 | Pore size (μm) | Initial flow rate (g/min) | Time point when flow rate reaches specific value (percentage compared to the initial flow rate)(min.) | | | |
|---|---|---|---|---|---|---|---|
| | | | | 90% | 80% | 70% | 50% |
| C | Example 3-1 | 7 | 44.9 | 12 | 42 | (no reduction after reaching 80%) | |
| | Example 3-2 | 2 | 5.7 | 135 | 795 | (no reduction after reaching 80%) | |

12: solution discharge pipe
12a: part of pipe
13: opening/closing valve
20: pressure medium supply source
21: pressure medium opening/closing valve
22: pressure medium supply line
30: in-line filter
31: filtering member
32: elastic member
33: housing
34: gasket
40: flow rate measuring unit
50: determination unit

The invention claimed is:

1. A system for determining a filter that is among a plurality of filters and that has a pore size in an optimal pore size range for evaluating a dissolution quality of a binder solution for a secondary battery electrode, the system comprising:
a pressure container which accommodates the binder solution and which connects to a first filter among the plurality of filters by a pipe;
a pressure medium supply source which supplies pressure medium of a predetermined pressure to the pressure container;
a flow rate measuring unit which measures a flow rate of the binder solution filtered by the first filter; and
a determination unit which measures a time point when the flow rate reaches a specific value predetermined in consideration of an initial flow rate,
wherein the determination unit is configured to repeat measurement of the flow rate for each of remaining filters among the plurality of filters, each filter among the plurality of filters having a different pore size, and
wherein the determination unit is configured to determine the filter that has the pore size in the optimal pore size range based on the time point.

2. The system of claim 1, wherein the determination unit determines a second filter that is among the plurality of filters and that has the time point equal to or less than a predetermined time point as the filter having the pore size in the optimal pore size range.

3. The system of claim 2, wherein the pressure medium is nitrogen, and nitrogen having a predetermined pressure is supplied from the pressure medium supply source to the pressure container.

4. The system of claim 3, wherein the pipe is extended into the pressure container, and an end of the pipe is installed to be adjacent to a bottom of the pressure container.

5. The system of claim 4, wherein the filter having the pore size in the optimal pore size range is an in-line filter which is installed in series in the pipe.

6. The system of claim 5, wherein the in-line filter includes a filtering member, an elastic member which presses the filtering member, and a housing where the filtering member and the elastic member are accommodated.

7. The system of claim 1, wherein the pressure medium is nitrogen, and nitrogen having a predetermined pressure is supplied from the pressure medium supply source to the pressure container.

8. The system of claim 1, wherein the pipe is extended into the pressure container, and an end of the pipe is installed to be adjacent to a bottom of the pressure container.

9. The system of claim 1, wherein the filter having the pore size in the optimal pore size range is an in-line filter which is installed in series in the pipe.

10. The system of claim 9, wherein the in-line filter includes a filtering member, an elastic member which presses the filtering member, and a housing where the filtering member and the elastic member are accommodated.

11. A method of determining a filter that is among the plurality of filters and that has a pore size in an optimal pore size range to be used for evaluating a dissolution quality of a binder solution for a secondary battery, the method comprising:
injecting a predetermined amount of binder solution into a pressure container;
transferring the binder solution to a first filter among the plurality of filters by supplying pressure medium of a predetermined pressure to the pressure container;
filtering the binder solution using the first filter;
measuring a flow rate of the binder solution having passed through the first filter;
measuring a time point when the flow rate reaches a specific value predetermined in consideration of an initial flow rate;
repeating the measuring of the flow rate for each of remaining filters among the plurality of filters, each filter having a different pore size; and
determining a second filter that is among the plurality of filters and that has the time point equal to or less than a predetermined time point as the filter having the pore size in the optimal pore size range.

12. The method of claim 11, wherein a third filter that is among the plurality of filters and that has the time point that is an earliest time point among the time point for each of the remaining filters among the plurality of filters is determined as the filter having the pore size in the optimal pore size range.

13. The method of claim 11, wherein a binder, which is a solute of the binder solution, is at least one selected from the group consisting of: (i) a non-aqueous binder including polyvinylidene fluoride-co-hexafluoropropylene (PVDF-co-HFP), polyvinylidene fluoride (PVDF), polyacrylonitrile, polymethyl methacrylate, polyvinyl alcohol, carboxyl methyl cellulose (CMC), starch, hydroxypropylcellulose, regenerated cellulose, polyvinylpyrrolidone, tetrafluoroethylene, polyethylene, polypropylene, polyacrylic acid, ethylene-propylene-diene monomer (EPDM), sulfonated EPDM, or polytetrafluoroethylene (PTFE); (ii) an aqueous binder including acrylonitrile-butadiene rubber, styrene-butadiene Rubber (SBR) or acrylic rubber; and (iii) a polymer resin including hydroxyethylcellulose or carboxymethylcellulose.

14. The method of claim 13, wherein a solvent of the binder solution is at least one selected from the group consisting of: (i) an organic solvent including N-methylpyrrolidone (NMP), dimethylformamide (DMF), acetone or dimethyl acetamide, and (ii) water.

15. The method of claim 11, wherein the binder solution is a PVDF solution obtained by dissolving a predetermined content of PVDF in an NMP solvent.

16. The method of claim 15, wherein a fourth filter that is among the plurality of filters and that has the time point, which is when the flow rate has decreased to 50% of the initial flow rate and which is less than a predetermined time point, is determined as the filter having the pore size in the optimal pore size range.

17. The method of claim 15, wherein a fifth filter that is among the plurality of filters and that has the time point, which is when the flow rate has decreased to 80% of the initial flow rate and which is less than a predetermined time point, is determined as the filter having the pore size in the optimal pore size range.

18. The method of claim 11, wherein a binder, which is a solute of the binder solution, is at least one selected from the group consisting of: (i) a non-aqueous binder including polyvinylidene fluoride-co-hexafluoropropylene (PVDF-co-HFP), polyvinylidene fluoride (PVDF), polyacrylonitrile, polymethyl methacrylate, polyvinyl alcohol, carboxyl methyl cellulose (CMC), starch, hydroxypropylcellulose, regenerated cellulose, polyvinylpyrrolidone, tetrafluoroethylene, polyethylene, polypropylene, polyacrylic acid, ethylene-propylene-diene monomer (EPDM), sulfonated EPDM, or polytetrafluoroethylene (PTFE); (ii) an aqueous binder including acrylonitrile-butadiene rubber, styrene-butadiene Rubber (SBR) or acrylic rubber; and (iii) a polymer resin including hydroxyethylcellulose or carboxymethylcellulose.

19. The method of claim 18, wherein a solvent of the binder solution is at least one selected from the group consisting of: (i) an organic solvent including N-methylpyrrolidone (NMP), dimethylformamide (DMF), acetone or dimethyl acetamide, and (ii) water.

20. The method of claim 19, wherein the solvent of the binder solution is the organic solvent including N-methylpyrrolidone (NMP) and the binder is the non-aqueous binder.

\* \* \* \* \*